US007925772B2

(12) United States Patent
Fujita

(10) Patent No.: US 7,925,772 B2
(45) Date of Patent: Apr. 12, 2011

(54) COMMUNICATION APPARATUS, IMAGE SENSING APPARATUS, AND CONTROL METHOD THEREFOR

(75) Inventor: Shunji Fujita, Kanagawa-ken (JP)

(73) Assignee: Canon Kabushiki Kaisha, Tokyo (JP)

(*) Notice: Subject to any disclaimer, the term of this patent is extended or adjusted under 35 U.S.C. 154(b) by 1449 days.

(21) Appl. No.: 11/044,863

(22) Filed: Jan. 27, 2005

(65) Prior Publication Data
US 2005/0198344 A1  Sep. 8, 2005

(30) Foreign Application Priority Data

Jan. 30, 2004  (JP) ................................. 2004-024730

(51) Int. Cl.
*G06F 15/16* (2006.01)
(52) U.S. Cl. ........................................ 709/231; 709/245
(58) Field of Classification Search .................. 709/231, 709/245
See application file for complete search history.

(56) References Cited

U.S. PATENT DOCUMENTS

| 6,801,507 B1* | 10/2004 | Humpleman et al. ........ 370/257 |
| 2003/0069981 A1 | 4/2003 | Trovato |
| 2005/0122934 A1 | 6/2005 | Fujita |
| 2005/0193127 A1* | 9/2005 | Moore et al. .................. 709/228 |
| 2005/0226209 A1 | 10/2005 | Miyahara et al. |
| 2006/0036733 A1* | 2/2006 | Fujimoto et al. .............. 709/225 |
| 2006/0104284 A1 | 5/2006 | Chen |
| 2006/0184661 A1* | 8/2006 | Weisman et al. ............. 709/224 |
| 2006/0291434 A1* | 12/2006 | Gu et al. ........................ 370/338 |
| 2007/0011280 A1 | 1/2007 | Colvig et al. |
| 2008/0016255 A1 | 1/2008 | Saint-Hilaire et al. |
| 2008/0091844 A1* | 4/2008 | Park .............................. 709/245 |
| 2008/0215712 A1* | 9/2008 | Ohara ........................... 709/220 |
| 2009/0219834 A1* | 9/2009 | Babbar et al. ................. 370/254 |
| 2009/0319695 A1* | 12/2009 | Saint-Hilaire et al. .......... 710/11 |
| 2009/0326684 A1* | 12/2009 | Wang et al. ..................... 700/83 |

FOREIGN PATENT DOCUMENTS

| JP | 10-327181 A | 12/1998 |
| JP | 2000209235 A | 7/2000 |
| JP | 2002237816 A | 8/2002 |
| WO | 03/084139 A | 10/2003 |

OTHER PUBLICATIONS

Microsoft, Automatic Windows 98/Me TCP/IP Addressing Without a DHCP Server, Jul. 6, 2001.*
Droms, Automated Configuration of TCP/IP with DHCP, Aug. 1999.*
Akihiro et al., Problems and Solutions of DHCP, Apr. 1995.*
Cheshire et al., Dynamic Configuration of IPv4 Link-Local Addresses, Apr. 15, 2002.*

(Continued)

*Primary Examiner* — Joseph E Avellino
*Assistant Examiner* — James E Conaway
(74) *Attorney, Agent, or Firm* — Cowan, Liebowitz & Latman, P.C.

(57) ABSTRACT

A communication apparatus such as a digital video camcoder acquires an IP address from a DHCP server on a UPnP network. During the communication apparatus is transmitting an image stream, which is a sensed image, to the DTV, the communication apparatus issues an IP address update request to the DHCP server. In this case, when the DHCP server leaves the UPnP network, the communication apparatus keeps transmitting the stream while holding an already set IP address. Upon completely transmitting the series of the stream, the communication apparatus generates its own IP address using an AutoIP function.

4 Claims, 8 Drawing Sheets

OTHER PUBLICATIONS

R. Droms, "Dynamic Host Configuration Protocol," Request for Comments RFC 2131, Bucknell University, Mar. 1997.

Ryan Troll, "Automatically Choosing an IP Address in an Ad-Hoc IPv4 Network," draft-ietf-dhc-ipv4-autoconfig-05.txt, Mar. 2, 2000.

Contributing Members of the UPnP™ Forum, "Universal Plug and Play (UPnP™) Device Architecture," Version 1.0, Jun. 8, 2000 10:41 AM.

Non-English Communication cited in Japanese Patent Applcation No. 2004-024730 on Jan. 16, 2009.

The above references were cited in a Jan. 26, 2009 Japanese Office Action that issued in Japanese Patent Application No. 2004-024731, which is not enclosed, which is a basic Japanese Patent Application of the related application of the subject case, namely, U.S. Appl. No. 11/045,783.

The above reference was cited in a Jul. 13, 2009 US Office Action that issued in related U.S. Appl. No. 11/045,783, which is enclosed.

The above references were cited in a Mar. 24, 2010 US Office Action that issued in related U.S. Appl. No. 11/045,783, which is enclosed.

* cited by examiner

FIG. 6

```
NOTIFY * HTTP/1.1
HOST : 192.168.1.1:1900
NT : search target
NTS : ssdp:byebye
USN : advertisement UUID
```

COMMUNICATION APPARATUS, IMAGE SENSING APPARATUS, AND CONTROL METHOD THEREFOR

FIELD OF THE INVENTION

The present invention relates to a technique for acquiring and updating an IP address in a communication apparatus such as an image sensing apparatus which communicates with a network using the IP address.

BACKGROUND OF THE INVENTION

In recent years, a network technique for searching for a device which provides a predetermined service on a network has been developed. As one example of this technique, Microsoft Corporation proposes UPnP (Universal Plug and Play) (for example, a reference "Universal Plug and Play Device Architecture Version 1.0, 08 Jun. 2000 10:41 AM"). UPnP defines a "service", "device", and "control point". The service is a logical unit for providing a predetermined service, the device is a logical unit including one or more services, and the control point is a logical unit for controlling the one or more services.

UPnP includes Internet standard techniques such as IP, TCP, UDP, and HTTP. With reference to the above reference which defines the automatic step of causing the devices to be connected to the network and to mutually detect and recognize, the step of actually controlling the devices, and the step of issuing an event, the addressing and discovery steps of UPnP will be described below.

Addressing is a step of acquiring a network address, i.e., IP address. The addressing step is a premise to be performed before the devices participate in the network and mutually operate. UpnP defines two means for setting the IP address.

The first means is a means for acquiring the IP address from a DHCP (Dynamic Host Configuration Protocol) server (for example, a reference "RFC 2131 Dynamic Host Configuration Protocol. IETF request for comments."). DHCP will be briefly described below.

An UPnP device must include a DHCP client function. When participating in the network, the UPnP device first checks the presence/absence of a DHCP server (DHCP DISCOVER). If the DHCP server is present in the network, the UPnP device can receive a response from the DHCP server (DHCP OFFER), apply an IP address request (DHCP REQUEST), and obtain a unique IP address arbitrarily generated by the DHCP server in the single network for a predetermined period of time (DHCP ACK). This predetermined period of time is a lease period. Hence, when the IP address is to be continuously used, the update request (DHCP REQUEST) must be applied to the DHCP server before the end of the lease period to obtain an update allowance. Also, when the IP address is not required, e.g., when the device leaves the network, the IP address must be returned to the DHCP server.

The second means is a means for setting the IP address using an AutoIP technique (for example, a reference "Automatically Choosing an IP Address in an Ad-Hoc IPv4 Network. IETF draft.") AutoIP will be briefly described below.

AutoIP is a function of causing the device itself to arbitrarily generate and set the IP address. An available IP address range is limited from address "169.254.1.0" to address "169.254.254.255". Upon recognizing the absence of the DHCP server on the network, the device arbitrarily generates the IP address in this IP address range. After confirming, by using an ARP (Address Resolution Protocol), the absence of another device which uses the same IP address in the same network, the device sets the IP address. Hence, addressing can be executed even in the network where the DHCP server is not present.

In order to prevent an increase in network traffic by ARP, the means by DHCP server assignment of the two means is preferentially used by UPnP. Therefore, the UPnP device set by AutoIP must constantly check whether the DHCP server is present on the network (DHCP DISCOVER). UPnP is recommended to check the DHCP server at intervals of 5 min.

The UPnP device sets the IP address in the addressing step, and then executes discovery. Discovery is the step of causing all of the devices on the network to automatically and mutually recognize. Discovery roughly defines two messages. One is an ALIVE message which notifies that the device participates in the network, and the other is a BYEBYE message which notifies that the device leaves the network. Since these messages are multicast, all of the devices on the network can mutually recognize their presence/absence. Each of the two messages is of a Notification type defined in accordance with a GENA protocol. Hence, the message can set four types of notice targets, i.e., a route device, UUID, device type, and service type.

The UPnP device sets the IP address by the means as described in the addressing step. However, in the network where the IP addresses of the plurality of UPnP devices are managed by the DHCP server, a problem to be described below occurs if the DHCP server leaves the network.

FIG. 7 shows the example of a sequence in this problem.

In FIG. 7, an UpnP network includes a digital video camcoder (to be referred to as a DVCR hereinafter), DHCP server, and digital television (to be referred to as a DTV hereinafter). All of these devices respectively use the IP addresses assigned by the DHCP server. Note that the DHCP server is the access point of a wireless LAN. However, the DHCP server is not limited to this. The DHCP server may be a PC and the like, and be connected with a wired network (e.g., Ethernet®).

In FIG. 7, the DHCP server has IP address "192.168.0.1" (fixed), the DVCR which is a DHCP client has IP address "192.168.0.2", and the DTV has IP address "192.168.0.3". Note that each of the devices generally has subnet mask "255.255.255.0".

Consider a case wherein the DHCP server suddenly leaves the network while the DVCR transfers recorded motion image data to the DTV by streaming (e.g., a case wherein a failure occurs, a power supply is turned off, or the DHCP server leaves the area of a wireless communication).

Assume that the DVCR issues an IP address update request immediately after the DHCP server leaves the network. Of course, since the DHCP server is not present, the response is not issued. That is, the DVCR detects the absence of the DHCP server, and then shifts to AutoIP to set an arbitrary IP address, e.g., address "169.254.1.1". However, in this case, the network address set by AutoIP (16-bit subnet mask "255.255.0.0" is defined) is different from the conventional network address set by using the IP address assigned by the DHCP server. Hence, the streaming transfer from the DVCR to the DTV is interrupted.

SUMMARY OF THE INVENTION

An object of the present invention is to overcome the above-described drawbacks.

Another object of the present invention, for example, is to provide a technique for preventing a data transfer between the devices from interruption caused when a DHCP server suddenly leaves an UPnP network, and minimizing the period of time in which the devices cannot exchange data, caused by the difference between the address setting change timings of the devices.

In an aspect of the present invention, there is provided a communication apparatus which includes network connection means, and transmits/receives a data stream to/from another apparatus via the network connection means, comprising:

DHCP client means for acquiring an IP address from a DHCP server on a network, and issuing an IP address update request before an end of a lease period of the acquired IP address;

IP address generation means for generating the own IP address when the DHCP client means fails to acquire the IP address from the DHCP server;

determination means for determining whether the data stream is being communicated with a communication partner apparatus when the DHCP client means fails to issue the update request to the DHCP server; and control means for, in a case wherein the determination means determines that the data stream is being communicated, maintaining an already set IP address used until the data stream is completely communicated, and for, in any one of a case wherein the determination means determines that the data stream is not being communicated, and a case wherein the data stream is completely communicated, causing the IP address generation means to generate the own IP address to maintain the connection to the network.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 6 is a view showing the example of the description content of a BYEBYE message issued by the UPnP device;

DETAILED DESCRIPTION OF THE PREFERRED EMBODIMENTS

Embodiments of the present invention will be described with reference to the accompanying drawings in detail below.

First Embodiment

Figure 1:
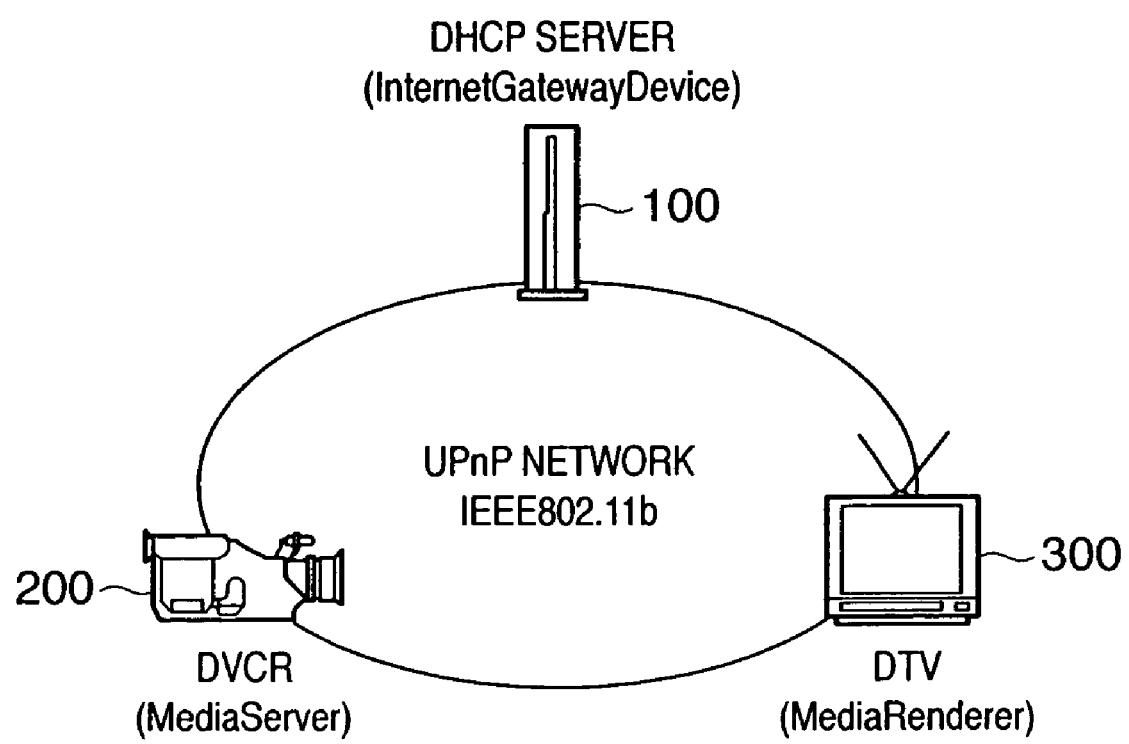
FIG. 1 is a view showing the arrangement of an UPnP network according to the first and second embodiments.

FIG. 1 is a view showing the example of an UPnP network arrangement. A digital video camcoder (to be referred to as a DVCR hereinafter) 200 is a device which functions as a MediaServer defined by the Audio Video Working Committee (AVWC). A digital television (to be referred to as a DTV) 300 is a device which functions as a MediaRenderer also defined by the AVWC. A DHCP server 100 is an Internet-GatewayDevice defined by the InternetGateway WC. The DTV 300 also functions as the control point of UPnP. All of the devices are connected with a wireless interface which is based on the IEEE802.b. Note that the DHCP server 100 in the first embodiment is implemented by an access point which is based on the IEEE802.b. Each of the DVCR 200 and DTV 300 functions as a DHCP client and AutoIP.

In the first embodiment, the present invention is applied to the DVCR 200. Note that the present invention can also be applied to an apparatus (e.g., digital camera, cellular phone, or mobile computer) besides the DVCR 200.

Figure 8:
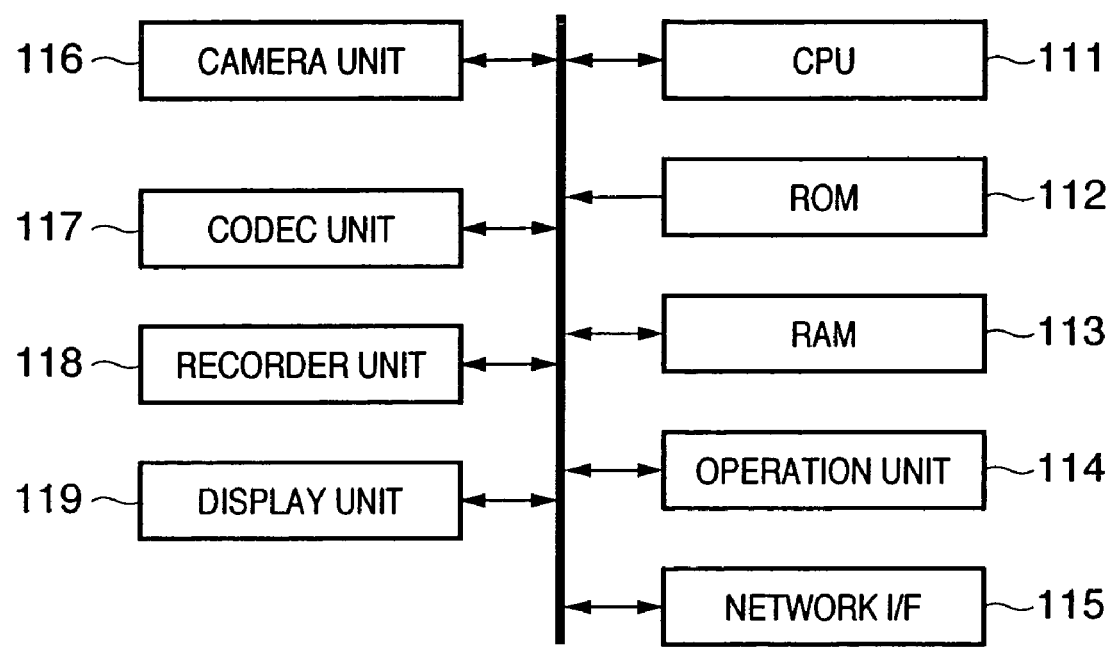
FIG. 8 is a block diagram of the DVCR according to the embodiments.

FIG. 8 is a block diagram showing the main elements of the DVCR 200 according to the first embodiment. The DVCR 200 includes a CPU 111 which controls the entire apparatus, and also includes the following arrangement.

Reference numeral 112 denotes a ROM which stores a control program, the UUID of the DVCR 200, device description, service description, and the like; 113, a RAM which serves as a work area; 114, an operation unit which has a recording button, various switches and buttons, a button (network participation button) for switching between participating in and leaving the UPnP network, and the like; 115, a network interface which is used to connect the device to the network; 116, a camera unit which includes an optical lens and image sensor (CCD sensor and the like); 117, a codec unit which compression-encodes/decodes data; 118, a recording unit which records/plays back image data on a recording medium (disk medium, magnetic tape, and the like); and 119, a display unit which has a liquid crystal display and the like.

In the above-described arrangement, when the power supply of the DVCR 200 and the network participation button are turned on, the IP address request is issued to the DHCP server 100 to participate in the UPnP network. After that, in accordance with an instruction from the control point (the DTV 300 in this embodiment) on the UPnP network, the audio motion image stream recorded on the recording medium is transmitted to the Mediarenderer (the DTV 300 also serves as the Mediarenderer in this embodiment) on the network to play back the motion image.

Figure 2:
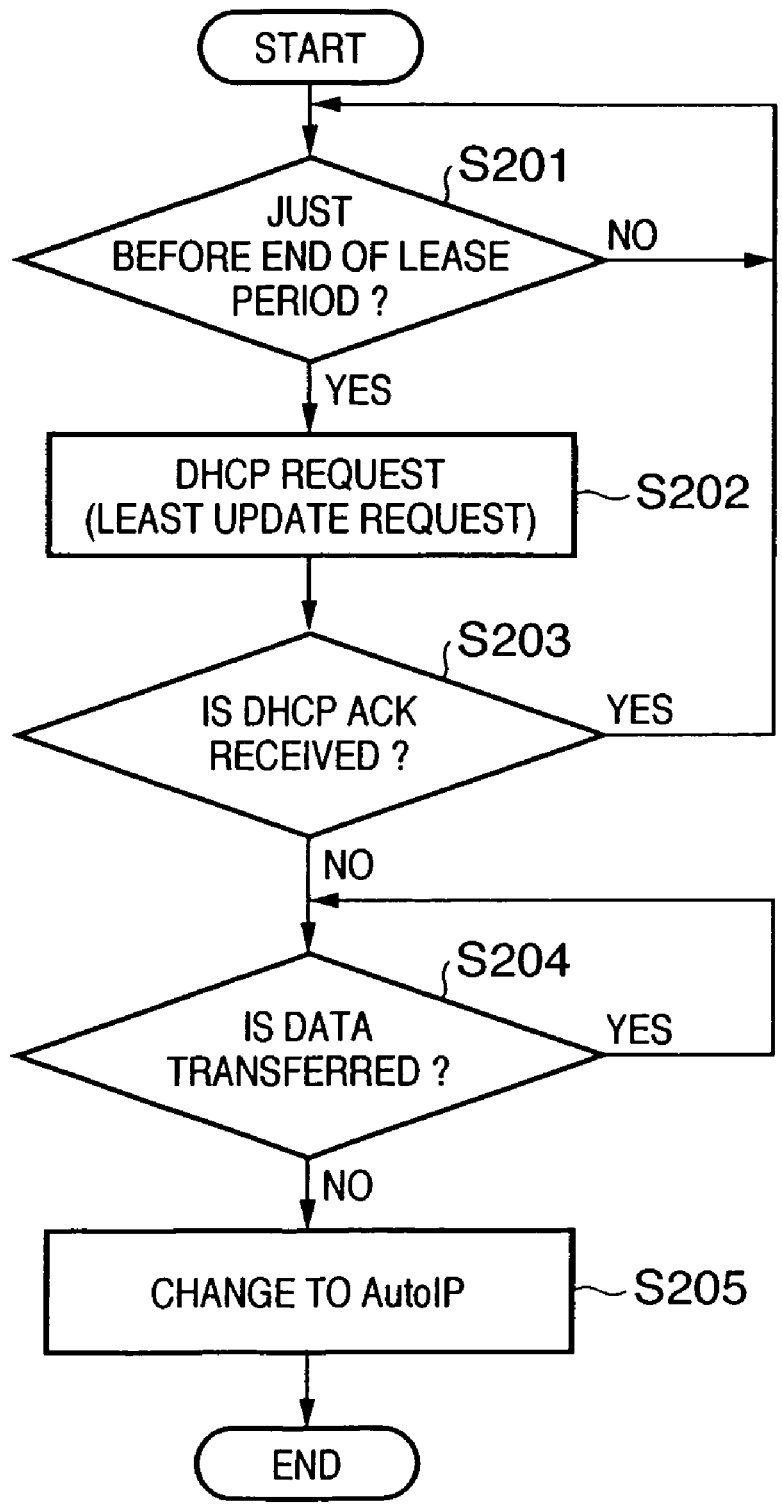
FIG. 2 is a flowchart showing the procedure of a DVCR in address shift according to the first embodiment.

Assume that while the DVCR 200 acquires the IP address from the DHCP server 100 as described above, and participates in the UPnP network to transmit the data, the DHCP server 100 leaves the network due to some reason (e.g., the communicative area of the DHCP server 100 is out of the communicative area of the DVCR 200, or the power supply of the DHCP server 100 is turned off). The process will be described below with reference to the flowchart shown in FIG. 2. Note that the process shown in FIG. 2 is performed as a task different from the data transmission process.

Before the end of the lease period of the IP address assigned by the DHCP server 100, the DVCR 200 constantly issues a lease update request (DHCP REQUEST) to the DHCP server 100 (steps S201 and S202).

After the lease update request (DHCP REQUEST) is issued, the lease period is updated when receiving an approval message (DHCP ACK) from the DHCP server 100 within a predetermined period of time in step S203. When the approval message (DHCP ACK) is not received from the DHCP server 100 within a predetermined period of time in step S203, the DVCR 200 checks its own connection state (step S204). When the device transmits/receives data to/from another device in the network, the IP address assigned by the DHCP server 100 is maintained. When the device does not transmit/receive the data to/from any device in the network, the IP address assigned by the DHCP server changes to an arbitrary IP address generated by AutoIP (step S205).

That is, when the approval message cannot be received from the DHCP server 100 even upon issuing the lease update request at the end of the lease period of the IP address during transmitting/receiving (or receiving/recording) the data, the DVCR 200 does not immediately shift to AutoIP, and shifts to AutoIP after the sequence of the data is completely transmitted/received.

Next, in the DVCR 200 for executing the above process, a sequence executed in the case wherein the DHCP server 100 leaves the network while the DVCR transfers the data will be described with reference to FIG. 3.

In the initial state, all of the devices respectively set the IP addresses assigned by the DHCP server 100. The DVCR 200 has IP address "192.168.0.2/24", the DTV has IP address "192.168.0.3/24", and the DHCP server has IP address "192.168.0.1/24" ("/24" represents that the 24th bit of the subnet mask is "1", i.e., subnet mask "255.255.255.0"). The lease period of the IP address of the DHCP server according to the first embodiment is 3 min. with respect to any device. Each of the devices issues a lease update request to the DHCP server every third minute. Note that the period of time is an example, and the present invention is not limited to this.

In such initial state, in a control point application on the DTV 300, the user selects the DVCR 200 as a data transmission source from the UPnP device (or the UPnP devices) in the network. After that, the user selects the image data in the DVCR 200, and presses a playback button. Along with this operation, the DTV 300 transmits a RTSP SETUP command to the DVCR 200, establishes a connection between the DTV 300 and the DVCR 200, and starts an RTP/RTSP streaming transfer in accordance with an RTSP PLAY command (timing T1). When receiving the RTSP PLAY command, the DVCR 200 starts transmitting the designated image data to the designated device (the DTV 300 in this embodiment) in accordance with an RTP protocol. The DTV 300 receives the motion image data transmitted from the DVCR 200 to display the motion image data on the display in real time.

After that, just before the end of the lease period of the IP address assigned by the DHCP server, the DTV 300 issues the lease update request (DHCP REQUEST) to the DHCP server 100. The DHCP server 100 receives this lease update request to update the lease period (DHCP ACK). The timing T2 in FIG. 3 denotes this operation.

Figure 3:
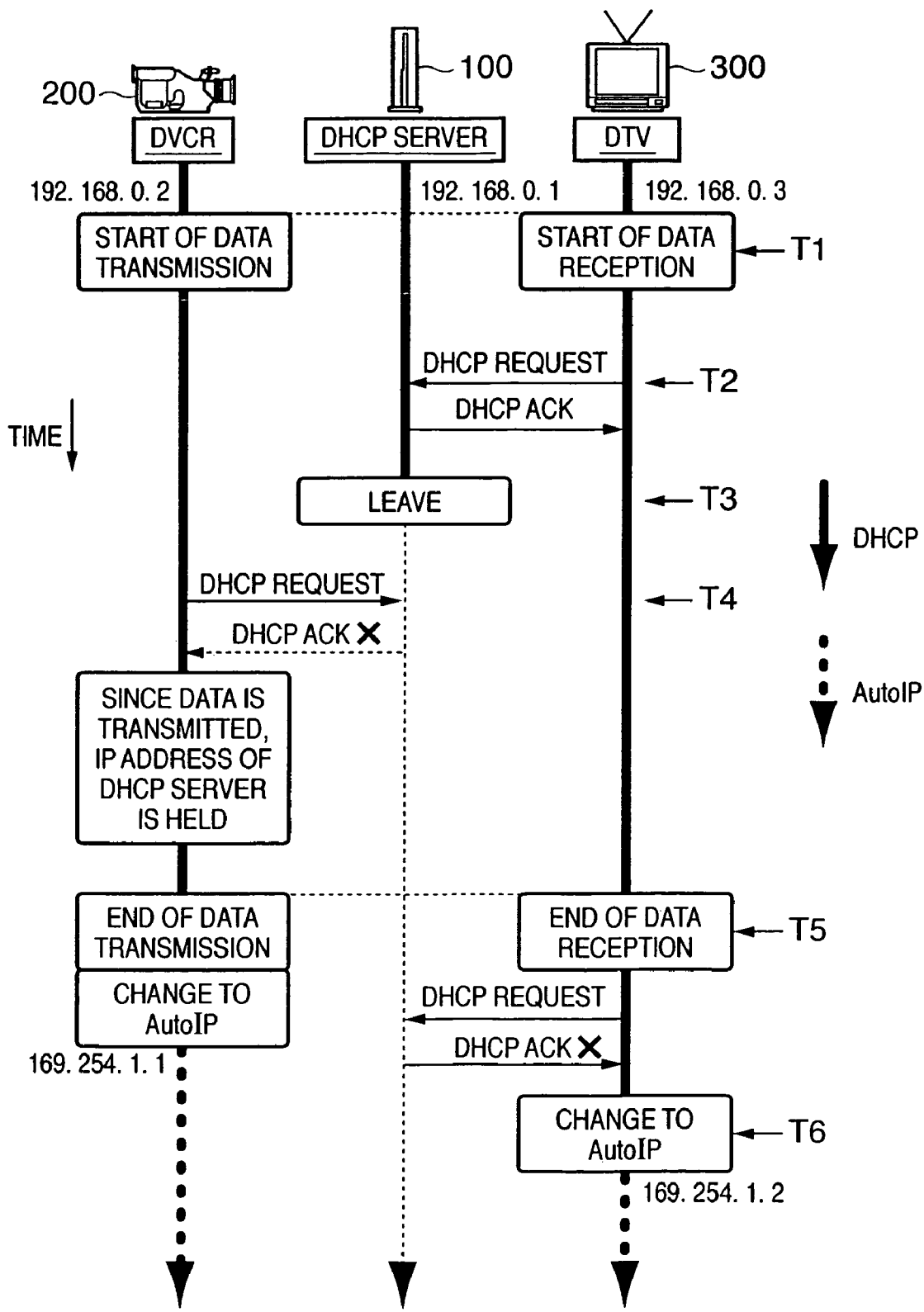
FIG. 3 is a view showing the sequence flow of the address shift of an UPnP device according to the first embodiment.

In FIG. 3, the DHCP server 100 leaves the network at the timing T3.

Just before the end of the lease period, the DVCR 200 issues the lease update request (DHCP REQUEST) to the DHCP server 100. However, since the DHCP server 100 is not present on the network, the DVCR 200 cannot receive the approval message from the DHCP server 100 (timing T4). Therefore, as the next process, the DVCR 200 confirms its own connection state. The DVCR 200 establishes a connection with the DTV 300 to transfer the motion image data by streaming. Hence, the DVCR 200 holds (maintains) the setting of IP address "192.168.0.2/24" assigned by the present DHCP server 100.

After the user completely appreciates the image data (the user presses a stop button using the control point application), the DTV 300 transmits an RTSP TEARDOWN command to the DVCR 200. Upon receiving this command, the DVCR 200 ends the data transfer to close the connection with the DTV. Upon closing the connection, the DVCR 200 generates a unique and arbitrary IP address in the same network by AutoIP, shifts the IP address assigned by the DHCP server to AutoIP, and changes the address to the IP address generated by the DVCR itself, e.g., IP address "169.254.1.1/16" (timing T5).

Even when the DTV 300 issues the lease update request (DHCP REQUEST) just before the end of the lease period, the approval message is not returned from the DHCP server. In this case, since the DTV 300 is not receiving the data, the DTV shifts to AutoIP to set a unique and arbitrary IP address, e.g., IP address "169.254.1.2" in the network (timing T6). The DVCR 200 and DTV 300 cannot mutually communicate from when the DVCR 200 shifts to AutoIP until the DTV 300 shifts to AutoIP. However, after the DVCR 200 and DTV 300 shift to AutoIP, they can mutually communicate again since they have the same network address.

As described above, the lease period of the IP address assigned by the DHCP server in the DVCR 200 is shorter than that in the DTV 300, and vice versa. That is, when the approval message is not returned from the DHCP server 100 even upon issuing the lease update request (DHCP REQUEST) to the DHCP server 100 just before the end of the lease period of the IP address during receiving the stream from the DVCR 200, the DTV 300 shifts to AutoIP after the data is completely played back (even after the end of the lease period).

As described above, according to the first embodiment, when no response is received from the DHCP server even upon issuing the IP address update request to the DHCP server, and the communication between the devices is established at that time, the device which can be connected to the UPnP network continuously uses the previous IP address assigned by the DHCP server, such that the established communication between the devices is not interrupted.

Second Embodiment

In the second embodiment, the timing to check whether a DHCP server 100 leaves a network is improved. For the sake of simplicity, a network arrangement in the second embodiment is same as that in FIG. 1, and the present invention is applied to a DVCR 200.

Figure 4:
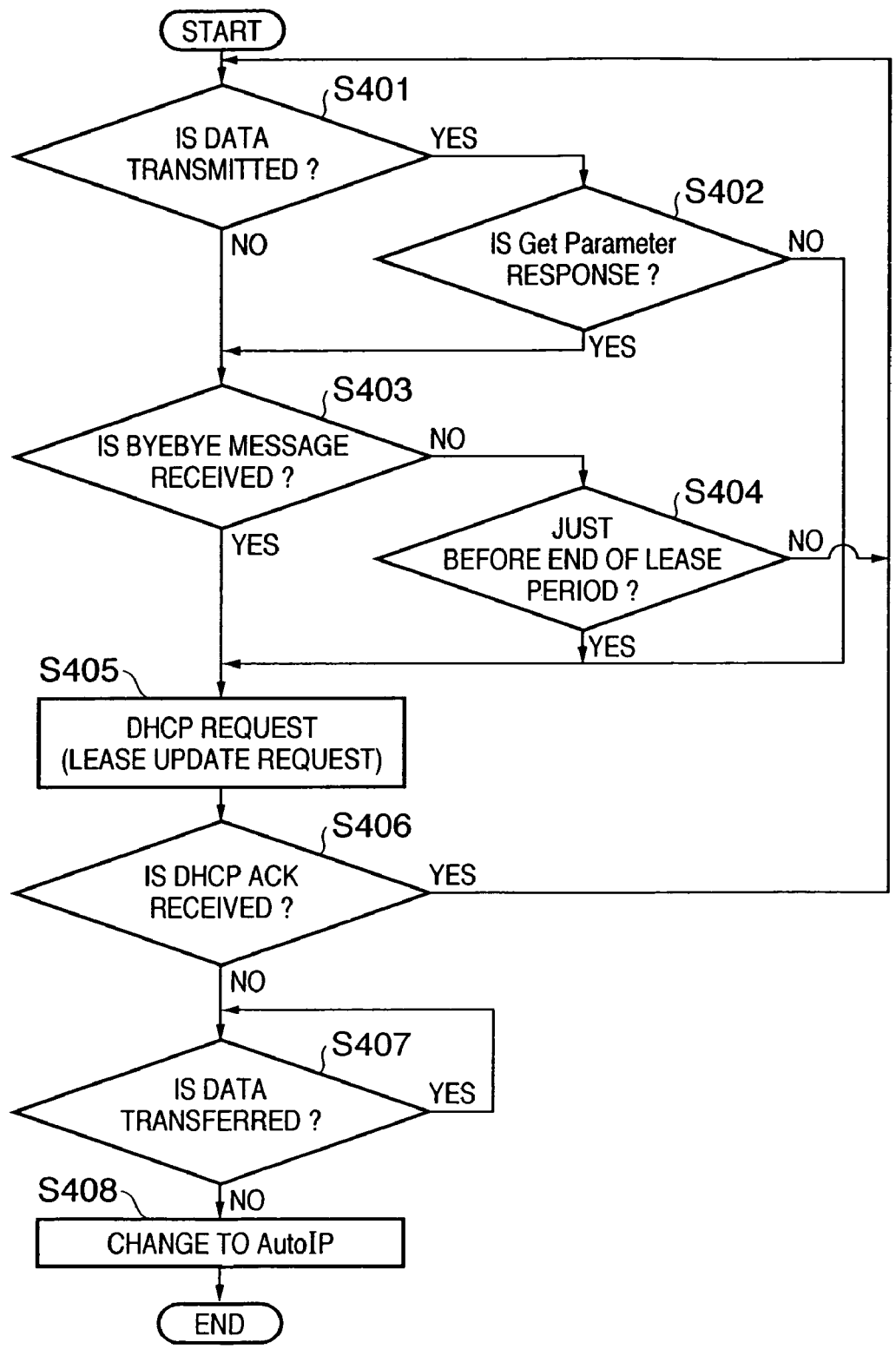
FIG. 4 is a flowchart showing the procedure of a DVCR in address shift according to the second embodiment.

The DVCR 200 in the second embodiment is processed in accordance with the flowchart in FIG. 4 from when an IP address is assigned by the DHCP server 100 until the DHCP server 100 shifts to AutoIP after leaving an UPnP network.

First, the DVCR 200 determines whether the data is transferred to another device on the network (step S401). In this embodiment, the DVCR 200 determines whether an RTP/RTSP transfer is performed. If YES in step S401, the DVCR 200 constantly confirms the connection with a connection partner (a DTV 300 in this embodiment) by using a GET PARAMETER command of RTSP in step S402 (step S402). When the confirmation response cannot be received from the connection partner to this request, the DVCR 200 infers that the connection partner executes addressing, and issues a lease update request to the DHCP server (step S405).

Assume that the data is not transferred, or a connection confirmation response is received from the connection partner during transferring the data. When determining that a BYEBYE message (a message which declares that the device leaves the UPnP network) is received from another device on the network (step S403), the DVCR 200 issues the lease update request to the DHCP server 100 (steps S405).

Even when the BYEBYE message is not received in step S403, the DVCR 200 issues the lease update request (DHCP REQUEST) to the DHCP server 100 (step S405) upon determining the lease period assigned by the DHCP server is ended (step S404).

When the flow advances to step S405, and the lease update request is issued to the DHCP server 100 to receive the DHCP ACK from the DHCP server 100 in a predetermined time-out period, the lease period is updated. In this case, the above time-out period is 2 sec, however, the present invention is not limited to this. When DHCP ACK is not received from the DHCP server 100 in the predetermined time-out period in step S405, the DVCR 200 checks whether the data is being transferred (step S407). If YES in step S407, the DVCR 200 maintains the conventional IP address setting assigned by the DHCP server 100 until the data is completely transferred, to maintain the data transfer. When the DVCR 200 determines that the data is completely transferred in step S407, the flow advances to step S408, and the DVCR 200 shifts to AutoIP to change the IP address and subnet mask (step S408).

Figure 5:
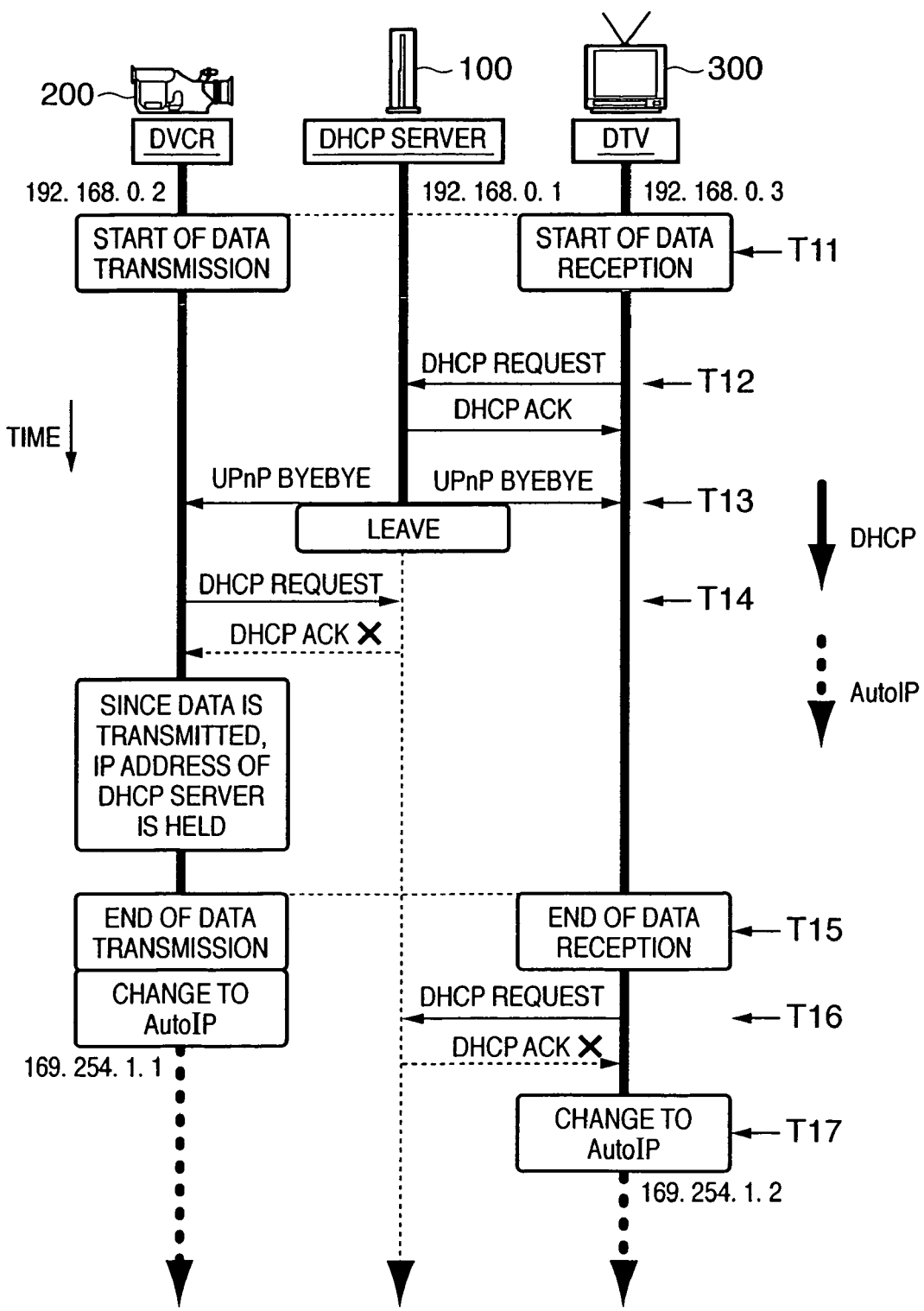
FIG. 5 is a view showing the sequence flow of the address shift of an UPnP device according to the second embodiment.
Figure 7:
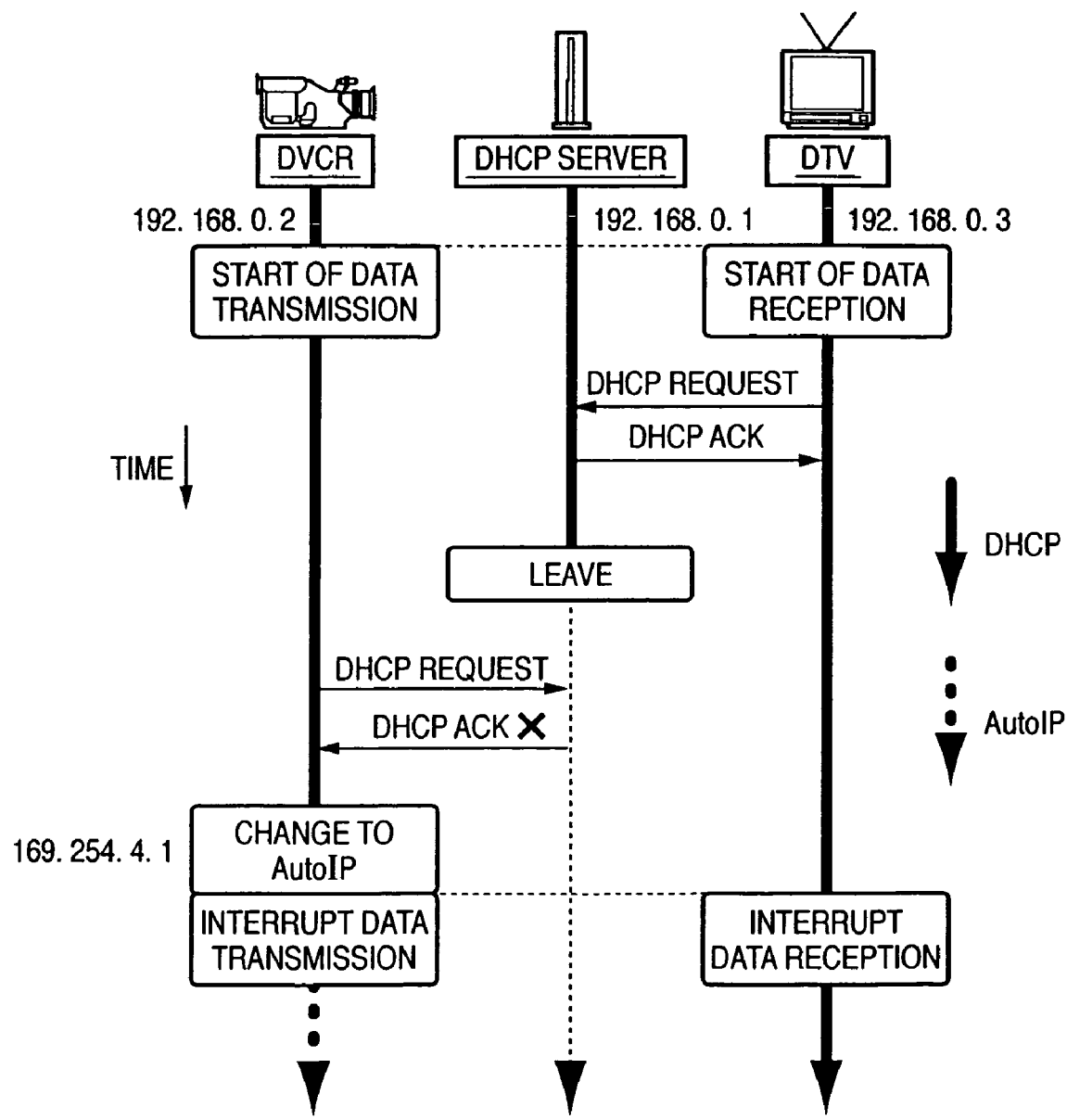
FIG. 7 is a view showing a conventional sequence when the DHCP server leaves the UPnP network.

Next, the example of a sequence executed in the case wherein the DHCP server 100 leaves the network while the DVCR 200 for executing the above process transfers the data will be described with reference to FIG. 5.

In the initial state, all of the devices (DVCR 200 and DTV 300) respectively set the IP addresses assigned by the DHCP server 100. The DVCR 200 has IP address/subnet mask "192.168.0.2/24", the DTV 300 has IP address/subnet mask "192.168.0.3/24", and the DHCP server 100 has IP address/subnet mask "192.168.0.1/24" (fixed). The lease period of the IP address of the DHCP server 100 according to the second embodiment is 3 min with respect to any device. Each of the devices issues a lease update request to the DHCP server 100 every third minute. Note that the period of time is an example, and the present invention is not limited to this.

In such initial state, in a control point application on the DTV 300, the user selects the DVCR 200 as a data transmission source from the UPnP device in the network in accordance with an operation unit (a remote controller having an operation button and the like) and the display menu of the DTV 300. After that, the user selects the image data in the DVCR 200, and presses a button for a playback request. Along with this operation, the DTV 300 transmits a RTSP SETUP command to the DVCR 200, establishes a connection between the DTV and the DVCR, and starts an RTP/RTSP streaming transfer of the selected image data by transmitting an RTSP PLAY command from the DTV 300 to the DVCR 200. When receiving the RTSP PLAY command, the DVCR 200 starts transmitting the designated image data in accordance with RTP. The DTV 300 receives the motion image data transmitted from the DVCR to start displaying the motion image data on the display in real time (timing T11). Note that in the sequence shown in FIG. 5, the DTV 300 always returns a confirmation response with respect to a GET PARAMETER command transmitted in order to confirm the connection while the DVCR 200 transmits the data by streaming.

After that, just before the end of the DHCP lease period (corresponding to 2-min after the last lease), the DTV 300 issues the lease update request (DHCP REQUEST) to the DHCP server 100. The DHCP server 100 receives this lease update request, sets a new lease period, and approves of updating the lease period (timing T12).

The DHCP server 100 then leaves the network. In this case, the DHCP server 100 which is an InternetGatewayDevice of UPnP multicasts the BYEBYE message just before leaving the network (timing T13).

As described above, when receiving the BYEBYE message, the DVCR 200 issues the lease update request (DHCP REQUEST) to the DHCP server 100. However, since the DHCP server 100 is not present on the UPnP network, the DVCR 200 cannot receive the approval message from the DHCP server 100. Therefore, the DVCR 200 confirms its own connection state. The DVCR 200 establishes a connection with the DTV 300 using the SETUP command of RTSP to transfer the motion image data by streaming. Hence, the DVCR 200 holds the setting of conventional IP address "192.168.0.2/24" assigned by the DHCP server 100.

After the user completely appreciates the image data, the user presses a stop button in the control point application. Along with this operation, the DTV 300 transmits an RTSP TEARDOWN command to the DVCR 200. Upon receiving this command, the DVCR 200 ends the data transfer to close the connection between the DVCR and the DTV. Upon closing the connection, the DVCR 200 generates a unique and arbitrary IP address in the same network by an AutoIP function, and changes the IP address assigned by the DHCP server to the IP address generated by AutoIP, i.e., IP address "169.254.1.1/16" (timing T15).

Even when the DTV 300 issues the lease update request (DHCP REQUEST) just before the end of the lease period, the approval message is not returned from the DHCP server (timing T16). Therefore, the DTV 300 sets a unique and arbitrary IP address, e.g., IP address "169.254.1.2" in the network using the AutoIP function (timing T17).

As can be apparent from the above description, the connection between the DVCR 200 and the DTV 300 cannot be established from the timing T15 to the timing T17. However, when the DTV 300 has the same function as that of the DVCR 200, the DTV 300 also shifts to AutoIP at the timing T15. Hence, apparently, the connection disable period of time can be actually prevented.

Modification of the Second Embodiment

In this modification, the received BYEBYE message in the second embodiment is additionally limited.

FIG. 6 shows the example of the BYEBYE message description issued by the device on the UPnP network. When multicasting the BYEBYE message, the UPnP device can set a notification target in an NT (Notification Type) header.

Therefore, in this NT header, when the device type is described as "InternetGatewayDevice", it is clear that the BYEBYE message is transmitted from the DHCP server 100. Hence, only in this case, the lease update request may be issued to the DHCP server. That is, in step S403 shown in FIG. 4, the NT header is checked to determine whether the NT header is the "InternetGatewayDevice" when receiving the BYEBYE message. Since the other operations are the same as those in the second embodiment, a description thereof will be omitted.

As described above, in the second embodiment and the modification of the second embodiment in addition to the function and effect in the first embodiment, the communication disable period of time of the UPnP device can be shortened when the DHCP server on the UPnP network leaves the UPnP network.

Note that in the embodiments, the three devices, i.e., the DHCP server 100, DVCR 200, and DTV 300 are present on the UPnP network. While there is one DHCP server, the numbers of the remaining devices are not limited if they fall within the available IP address range.

In the embodiments, the UPnP network is based on the IEEE802.11b. However, the UPnP network may be based on the IEEE802.11a or IEEE802.11g, or be configured by Ultra-WideBand or Bluetooth. Furthermore, the UPnP network may be not only a wireless network but also a wired network (e.g., Ethernet®, USB, and IEEE1394).

In the embodiments, the DTV 300 serves as the control point on the UPnP network. However, since any device including a certain display means (display unit) and operation unit can serve as the control point, a PC or the like may also be used. More specifically, the DVCR 200 serves as the data transmission source in the embodiments. However, since the PC or the like can also serve as the data transmission source by installing a dedicated application, the present invention also incorporates a computer program, apparently. Also, the computer program is generally stored in a computer-readable storage medium such as a CDROM, and can be executed by being set in the computer, and copied or installed to a system. Hence, of course, the present invention also incorporates the computer-readable storage medium.

As described above, in the present invention, even when the DHCP server leaves the network due to some reason, the data stream transmission can be prevented from interruption. Furthermore, even when the DHCP server leaves the network, the network connection disable state period of time can be shortened.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application No. 2004-024730 filed on Jan. 30, 2004, which is hereby incorporated by reference herein.

What is claimed is:

1. A communication apparatus comprising:
    a network interface unit that transmits image data to an external device via a network; and
    a control unit that (a) determines whether or not the communication apparatus receives a BYEBYE message via the network, (b) controls the communication apparatus to transmit a lease update request for updating a lease period of a internet protocol (IP) address assigned by a dynamic host configuration protocol (DHCP) server to the DHCP server if it is determined that the communication apparatus receives the BYEBYE message via the network, (c) determines whether or not the communication apparatus receives an acknowledgement of the lease update request within a predetermined period if it is determined that the communication apparatus receives the BYEBYE message via the network and the communication apparatus transmits the lease update request to the DHCP server, (d) determines whether or not the transmission of the image data is ended if it is determined that the communication apparatus does not receive the acknowledgement of the lease update request within the predetermined period, (e) changes the IP address assigned by the DHCP server to a new IP address generated in the communication apparatus if it is determined that the transmission of the image data is ended, and (f) maintains the IP address assigned by the DHCP server until the transmission of the image data is ended if it is determined that the transmission of the image data is not ended.

2. The communication apparatus according to claim 1, wherein the network is a Universal Plug and Play (UPnP) network.

3. A method of controlling a communication apparatus, the method comprising:
    transmitting image data to an external device via a network;
    determining whether or not the communication apparatus receives a BYEBYE message via the network;
    controlling the communication apparatus to transmit a lease update request for updating a lease period of a internet protocol (IP) address assigned by a dynamic host configuration protocol (DHCP) server to the DHCP server if it is determined that the communication apparatus receives the BYEBYE message via the network;
    determining whether or not the communication apparatus receives an acknowledgement of the lease update request within a predetermined period if it is determined that the communication apparatus receives the BYEBYE message via the network and the communication apparatus transmits the lease update request to the DHCP server;
    determining whether or not the transmission of the image data is ended if it is determined that the communication apparatus does not receive the acknowledgement of the lease update request within the predetermined period;
    changing the IP address assigned by the DHCP server to a new IP address generated in the communication apparatus if it is determined that the transmission of the image data is ended; and;
    maintaining the IP address assigned by the DHCP server until the transmission of the image data is ended if it is determined that the transmission of the image data is not ended.

4. The method according to claim 1, wherein the network is a Universal Plug and Play (UPnP) network.

* * * * *